(12) United States Patent
Convertino et al.

(10) Patent No.: US 8,983,828 B2
(45) Date of Patent: Mar. 17, 2015

(54) SYSTEM AND METHOD FOR EXTRACTING AND REUSING METADATA TO ANALYZE MESSAGE CONTENT

(71) Applicant: Palo Alto Research Center Incorporated, Palo Alto, CA (US)

(72) Inventors: Gregorio Convertino, Taranto (IT); Lichan Hong, Mountain View, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 228 days.

(21) Appl. No.: 13/670,363

(22) Filed: Nov. 6, 2012

(65) Prior Publication Data

US 2014/0129210 A1 May 8, 2014

(51) Int. Cl.
*G06F 17/27* (2006.01)
*G06F 17/20* (2006.01)
*G06F 17/21* (2006.01)

(52) U.S. Cl.
USPC ..................................... 704/9; 704/1; 704/10

(58) Field of Classification Search
CPC ................................ G06F 17/02; G06F 17/03
USPC .................................................. 704/1, 9, 10
See application file for complete search history.

(56) References Cited

U.S. PATENT DOCUMENTS

| 8,412,796 | B2* | 4/2013 | Smyth et al. | 709/217 |
| 8,589,399 | B1* | 11/2013 | Lee et al. | 707/737 |
| 2011/0246463 | A1* | 10/2011 | Carson et al. | 707/737 |
| 2013/0151522 | A1* | 6/2013 | Aggarwal et al. | 707/737 |
| 2014/0095504 | A1* | 4/2014 | Soroushian | 707/737 |

* cited by examiner

*Primary Examiner* — Jesse Pullias
(74) *Attorney, Agent, or Firm* — Patrick J. S. Inouye; Krista A. Wittman (57) ABSTRACT

A system and method for extracting and reusing metadata to analyze messages is provided. A stream of messages is monitored. Those messages with a predetermined message component pointing to a referent are identified. Words that are related to the referent are extracted from each of the messages. A local similarity of the identified messages is determined by comparing the extracted words of each message. A global similarity of the identified messages is determined by combining the extracted words from all the identified messages and by comparing the combined extracted words with extracted words from all messages that include a different referent. A determination is made as to whether one or more of the extracted words from the identified messages are descriptive of the referent based on the local and global comparisons.

20 Claims, 8 Drawing Sheets

SYSTEM AND METHOD FOR EXTRACTING AND REUSING METADATA TO ANALYZE MESSAGE CONTENT

FIELD

This application relates in general to semantic Web applications, and in particular, to a system and method for extracting and reusing metadata.

BACKGROUND

Currently, semantic capabilities are used in Web applications, such as tools for searching and browsing, data summarization, data reorganization, and automatic inferences of logical relations in the data. These capabilities are associated with heavy requirements and costs for providing "exhaustive" amounts of metadata. Yet, part of the responsibility for providing the metadata can be placed on the users. For instance, some Web-based services allow users to tag Web documents of interest for sharing or recalling by assigning one or more keywords to the documents. Data obtained from the tagging can be used to describe the documents and enhance document searches.

However, many social Web repositories, such as del.icio.us and Flickr, make available only sparse amounts of data and metadata, and authors are not encouraged to provide semantically rich content via tagging due to a lack of return value. Therefore, without the appropriate metadata, the benefits of the semantic capabilities that augment various Web applications cannot be offered. A vicious circle is created where authors are not motivated enough to provide semantically rich content because they do not see enough return value in the current applications and the semantic capabilities cannot offer the potential benefits until enough metadata is made available. This vicious cycle can be broken by enabling automatic extraction and reuse of metadata from the new growing volume of data made available by social streams in social networking or micro-blogging tools such as Twitter, Yammer, Facebook, and MySpace. For example, in the Twitter system, during 2012, about 500 million Twitter users generated between 300 to 400 million tweets per day. Further, a study of Twitter in 2011 found that about one out of every five Twitter messages includes a uniform resource locator (URL) and the text in the tweet is generally a comment about the URL. Thus, the URL and text can include useful metadata, as provided in Lichan Hong, Gregorio Convertino, Ed H. Chi. Language Matters In Twitter: A Large Scale Study. In Proceedings of ICWSM 2011.

Thus, there is a need for a system and method to automatically extract and reuse existing metadata to provide semantic capabilities for characterizing and clustering message content.

SUMMARY

A portion of the messages from a social networking medium include references to documents, such as a Uniform Resource Locator ("URL") pointing to a Wikipedia page, and commentary text about the reference. Words in the commentary text that distinguish the content of a first document from the content of a second document are assigned as labels to the reference to the first document. Specifically, the labels are determined by obtaining a corpus of messages and selecting only those messages that include a predetermined message component, such as a Uniform Resource Locator ("URL"), which acts as a pointer to a document, labeled as a referent. Then, one or more words of the commentary text associated with the referent are extracted and compared with words from the other messages in the corpus. The words that are discriminatory of the referent are selected. The selection is performed based on frequencies of the words with respect to the same referent across all the messages in the corpus. Discriminatory words can be used multiple times for the same referent and help to discriminate this referent among all the referents.

A further embodiment provides a system and method for extracting and reusing metadata to analyze message content, to infer aspects of a logical relation between commentary text and content of the referent, and to categorize the message content on the basis of the logical relation. First, one or more words in the message associated, as commentary text, with the message component are extracted as discriminatory of the referent. Then, specific aspects of the relationship between the words of the commentary text and the referent are inferred. A first aspect that can be determined is a similarity among documents using bag-of-word vectors and TF-IDF measures or using a topic modeling method. Another aspect that can be inferred is the super-subordinate semantic relation between the words and the referent. The commentary text can be a more specific description of the referent content by adding additional details or extending the content. Alternatively, a more general description or categorization of the referent, such as keywords that categorize the domain of the referent, is possible. This inference text can be obtained by applying computational linguistics methods that are based on public lexical databases, such WordNet, to define the super-subordinate relation between commentary text and the content of the referent. For example, metadata that gives more general descriptions or helps to categorize the referent can be automatically isolated.

Another aspect of the relation that can be determined is the function of the commentary text. For example, a description or summary of the referent content versus an opinion about the referent content can be determined. This characterization of the commentary text can be performed by combining sentiment analysis methods with the method mentioned above. In one example, the editor of an online newspaper can track the diffusion of URLs on Twitter to measure which of their news had an impact on the audience, whether the news was simply forwarded or provoked opinions by the readers, or invoked position or negative opinions.

A still further embodiment provides a system and method for extracting and reusing metadata to analyze messages. A stream of messages is monitored. Those messages with a predetermined message component pointing to a referent are identified. Words that are related to the referent are extracted from each of the identified messages. A local similarity of the identified messages is determined by comparing the extracted words of each message. A global similarity of the identified messages is determined by combining the extracted words from all the identified messages and by comparing the combined extracted words with extracted words from all messages that include a different referent. A determination is made as to whether one or more of the extracted words from the identified messages are descriptive of the referent based on the local and global comparisons.

Further, different versions of the embodiments described above can be applied to extracting and reusing metadata of URLs or names from public data streams, from social networking or micro-blogging tools, or alternatively, from email messages exchanged within organizations where email remains one of the most common tools for sharing information.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
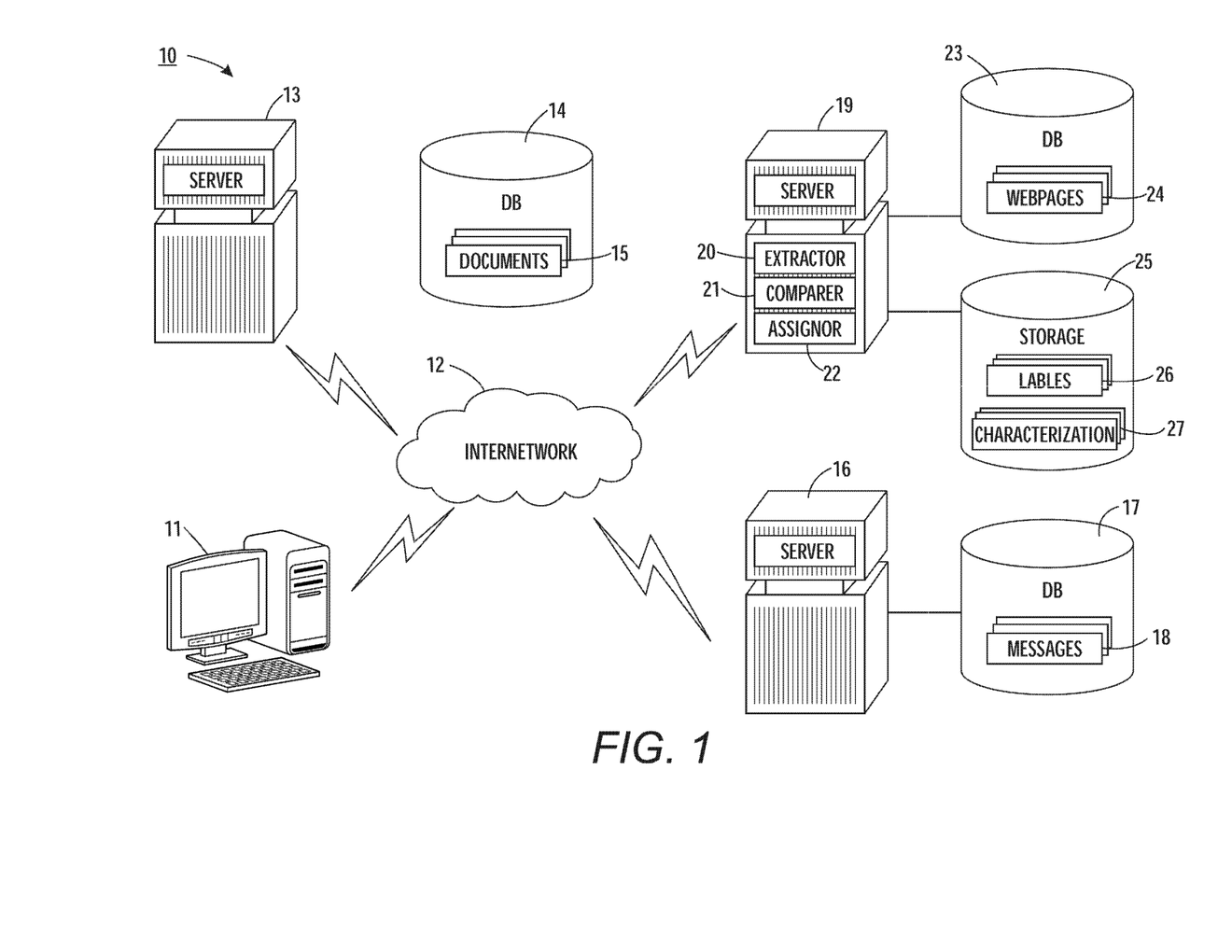
FIG. 1 is a block diagram showing a system for extracting and reusing metadata to analyze message content, in accordance with one embodiment.

With the increase in social media and available information online, large volumes of data, such as messages, are being shared between users. The shared data includes useful metadata, which can be used to organize and classify the data, as well as provide information to users of the data. FIG. 1 is a block diagram showing a system for extracting and reusing metadata to analyze message content, in accordance with one embodiment. A user device 11 is connected to one or more servers, including a document server 13, message server 16, and metadata server 19 via an internetwork 11, such as the Internet. The user device 11 can include a computer, laptop, or mobile device, such as a cellular telephone or personal digital assistant. In general, the user device 11 is a Web-enabled device that executes a Web browser or similar application, which supports interfacing to and information exchange and retrieval with the servers 13, 16, 19. Both the user device 11 and servers 13, 16, 19 include components conventionally found in general purpose programmable computing devices, such as a central processing unit, memory, input/output ports, network interfaces, and non-volatile storage, although other components are possible. Moreover, other information sources in lieu of or in addition to the servers, and other information consumers, in lieu of or in addition to user devices, are possible.

The user device 11 requests from the metadata server 19, a Web page 24, which is stored in a database 23 coupled to the server 19. The Web page 24 is transmitted to the user device 11 and one or more messages 18 can be obtained via the Web page 24 from a database 17 coupled to the message server 16. In a further embodiment, the messages 18 can be stored in the storage 25 coupled to the metadata server 19.

The messages 18 can be analyzed by the metadata server 19 to provide discriminatory labels 26 for characterizing content 27 of the messages 18. The metadata server 19 includes an extractor 20, comparer 21, and an assignor 22. The extractor 20 extracts a message component, such as a URL or unique name, and related words from the messages 18. The message component points to one or more documents 15, known as referents, that can be stored in one or more databases 14 coupled to the document server 13, which can be remote or local. For example, large volumes of shared content include micro-blogging messages, bookmarks, reviews, photographs, and videos. These units of data are not only shared but also annotated with text via the Internet. Thus, they can contain useful metadata that can provide additional information to users. For example, a message, such as a tweet, may include a commentary about a particular Uniform Resource Locator (URL) or a commentary about the name of a uniquely identifiable and publicly known object, such as "planet Mars;" a person, such as "Barack Obama;" a place, such as "France;" or an event, such as "Hurricane Katrina." The Uniform Resource Locator (URL) and the name each points to a document, such as a Wikipedia page, which is labeled as a referent. Specifically, the URL or the name is a reference to the content of the referent, such as the Wikipedia page. The text of the commentary that annotates the URL or the name includes useful metadata that can be used to determine an importance or relevance of the referent identified by the URL or unique name.

To determine the importance or relevance, the comparer 21 compares the words of one of the messages with words of other messages and the assignor 22 designates at least a portion of the words as labels 26 that are most discriminative of the document 15 identified by the message component in those messages. For example, the labels represent those words that tend only to occur when users are discussing the particular document 15. Once the labels 26 are assigned to the messages, the assignor 22 further provides characterizations 27 of the message content using the labels 26. The labels 26 and characterizations 27 are maintained in the storage 25 coupled to the metadata server 19.

The user device 11 and servers 13, 16, 19 can include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components.

Figure 2:
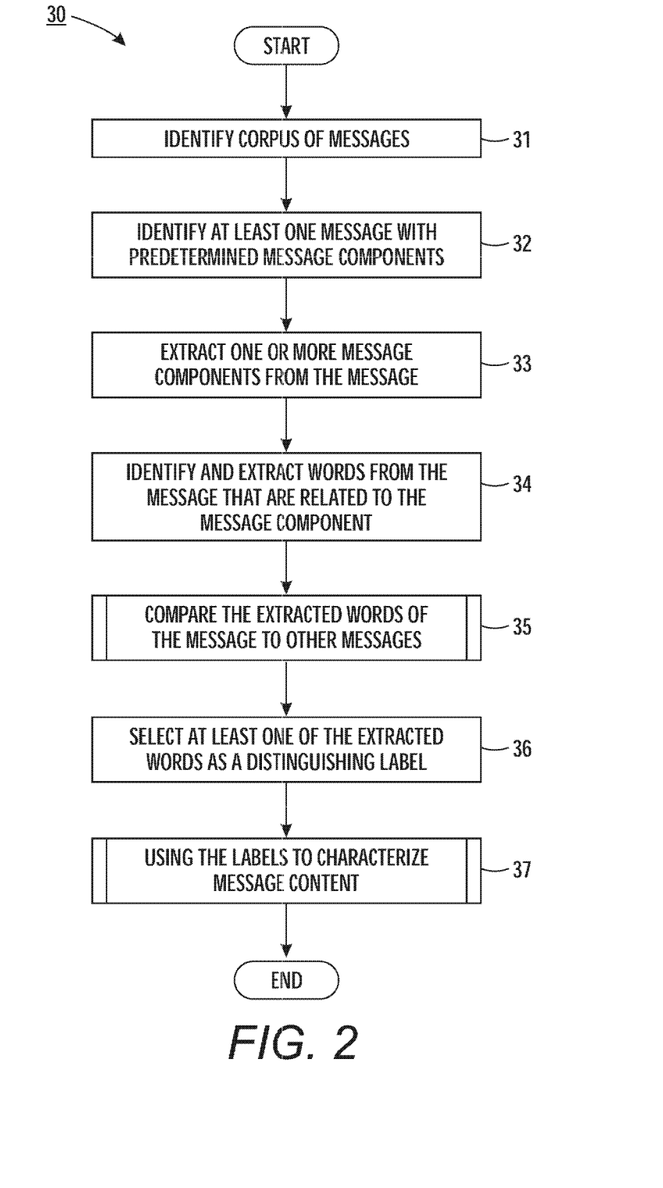
FIG. 2 is a flow diagram showing a method for extracting and reusing metadata to analyze message content, in accordance with one embodiment.

Discriminatory labels can be assigned to one or more messages based on a document, also known as a referent, that is identified in the message via a link or by unique name. FIG. 2 is a flow diagram showing a method for extracting and reusing metadata to analyze message content, in accordance with one embodiment. A corpus of messages is identified (block 31). The messages can include micro-blogging messages, bookmarks, or photographs, as well as other types of messages. At a minimum, the messages should be able to be shared and annotated. Those messages having predetermined message components, such as a Uniform Resource Locator ("URL") or a unique name for a person or place are identified (block 32). Other predetermined message components are possible. The URL is a link that provides a pointer to a document, such as a Web page. The document to which the URL points can be identified as a referent. A referent can include a document, such as an article, book, Web page, or attachment, as well as other types of documents, which are referenced by the message component.

Additionally, a unique name, such as for a publicly known object, a person, place or event, can be used as a reference to identify an associated referent. For example, a message includes the name "Barack Obama." The referent associated with the unique name can be automatically identified through a knowledge base that federates public sources such as dbpedia.org, Wikipedia.org, and domain-specific knowledge bases, such as for Chemistry and Biology. In 2012, the English version of the DBpedia knowledge base describes 2.35 million things, which are classified in a consistent ontology, including 764,000 persons, 573,000 places, 333,000 creative works, such as music albums, films and video games, 192,000 organizations (companies and educational institutions), 202,000 species and 5,500 diseases. The referent associated with the unique name "Barack Obama" can be the Wikipedia page, http://en.wikipedia.org/wiki/Barack_obama, which can be identified via Dbpedia. Alternatively, the referent for the unique name "Barack Obama" can be another document, such as an article, book, or attachment.

Once identified, at least one of the message components can be extracted from each message that includes that message component (block 33). The URLs can each be extracted by decompressing the URL through natural language processing and by leveraging tools such as bitly.com. Meanwhile, the unique names can be extracted using entity extraction. If the same unique name can point to different entities, then the unique name can be disambiguated through natural language processing techniques that compare the text in the message with the unique name or in other messages by the same author, with the content of the different entities for the unique name in the knowledge base. For example, the term "mercury" as used in a message can refer to a chemical element, a planet, or a mythological figure. To determine which meaning is correct, content of the message or other related messages can be compared to entries in the knowledge base for each of the meanings. The meaning that is most similar to the content of the message is selected for the unique name.

Subsequently, words in the commentary text that are related to the extracted message component can also be extracted (block 34) from each of the messages with the message component. In one embodiment, the words can be extracted using natural language processing techniques. For example, each word in a message is identified and optionally tagged via a parts-of-speech tagger. Stop words, such as "a," "the," and "or" are removed from the identified words, as well as other stop words. The remaining words are then designated as candidate labels for distinguishing the referent indicated in the message via the message component from other referents identified by other message components in other messages.

However, short text messages, such as tweets, are generally limited to a particular size measured by characters or words. Yet, tf-idf generally assumes that the frequency or popularity of a term models the importance of that term. For example, the importance of a term increases the more times the term is identified in a document. However, in short messages, terms are usually not repeated to conserve space and important words may not be identified in the message due to restrictions on message size.

To ensure that the important words in a message are correctly identified, the message can be optionally expanded as described in commonly-owned U.S. patent application Ser. No. 12/464,810, filed on Dec. 23, 2009, which is hereby incorporated by reference. Tokens, such as nouns, noun phrases, and root stems can be identified and extracted from the content of a message. Other tokens are possible. The extracted tokens can then be used to form a search query for applying to a set of documents. The set of documents can include Web-based documents, or remotely or locally stored electronic documents. The search query can be executed through known search engines, such as Yahoo or Google; search engines operating specifically on data from one or more social networking or micro-blogging tools, such as Twitter or Facebook; through internal search engines; or any combination of the above listed search engines. Documents that match one or more tokens of the search query are identified as search results. The number of documents returned as search results can be determined using a result threshold or rank. Other measures for determining the search results are possible.

The search result documents can be merged into a single document, which is representative of the message as an expanded message. The expanded message can include terms, or candidate labels, that are included in the message with the message component or that are only included in the expanded message, and not the original message. The candidate labels can be identified and extracted using natural language processing techniques as described above.

Figure 3:
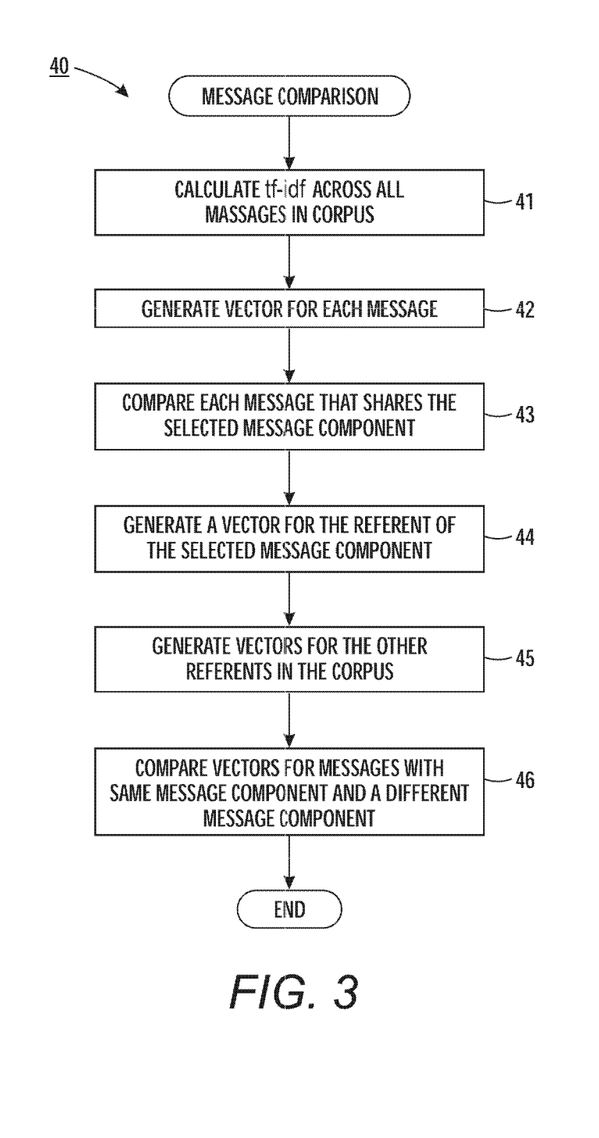
FIG. 3 is a flow diagram showing, by way of example, a process for comparing messages to identify discriminatory labels.

Once determined, the candidate labels of the messages are compared (block 35) to identify discriminatory labels. Specifically, the candidate labels for each of the messages with the same message component are compared and subsequently, the candidate labels for all the messages with the same message component are compared with candidate labels for the messages with different message components. FIG. 3 is a flow diagram showing, by way of example, a process 40 for comparing messages to identify discriminatory labels.

Each of the messages or expanded messages in the corpus can be represented as unordered collections of words or bag-of-words vectors. The extracted words from each message or expanded message are assigned a relevance value, which identifies a relevance of that particular word in relation to the referent of the message component. The relevance values can be determined using word repetition detection techniques, such as term frequency-inverse document frequency ("tf-idf"), which can be applied (block 41) to each word across all messages with the same message component. A vector is generated (block 42) for each of the messages or expanded messages in the corpus and can include the extracted terms, or candidate labels, of the messages and associated relevance values for that term. The vectors of the messages that share the message component are compared (block 43) to determine a local similarity of the messages. In one embodiment, the similarity can be calculated using cosine similarity, which is measured as the inner product of the two vectors for the messages, or sum of the pairwise multiplied elements, divided by the product of their vector lengths. Messages that do not share a single word get assigned a similarity of zero.

For instance, returning to the above example, the unique name message component for "Barack Obama" is selected. A message vector is generated for each message that includes the message component by identifying the candidate labels and determining the tf-idf values associated with each of the candidate labels. The messages are then analyzed by comparing the vectors of each message to determine the similarity of the messages that include the same message component.

Subsequently, a bag-of-words vector is generated (block 44) for the referent of the selected message component by combining all the messages that share the same message component, identifying the candidate labels for the combined messages, and determining the tf-idf values over all the messages, as described above. A bag-of-words vector is also generated (block 45) for the other referents identified in the corpus by combining all the messages with message components directed to that referent, identifying the candidate labels within the combined messages, and determining the tf-idf values over all the messages, as described above. The vector for the referent is then compared (block 46) with the vectors for the other referents in the corpus to determine a global similarity or dissimilarity of the messages associated with the selected referent and the messages associated with other referents.

Returning to the above example, the message vectors for the unique name message component, "Barack Obama," are combined to generate a referent vector for the referent, to which the message component points. In this example, the referent is the wikipedia page for Barack Obama, http://en.wikipedia.org/wikiBarack_obama. The candidate labels for each of the messages are obtained. If two or more messages share a candidate label, the candidate labels are merged. New tf-idf scores are generated over all the messages. The candidate labels and tf-idf scores are then combined to generate the referent vector.

Other referent vectors are generated for the other referents identified in the corpus by combining all the messages that share a message component that points to the other referent, identifying candidate labels from the combined messages, and calculating tf-idf scores across all the messages. The other referent can be a Wikipedia page for Mitt Romney, which is referenced by the message component, "Mitt Romney." The vector for the referent about Barack Obama is then compared with the vectors for the other referents, including those about Mitt Romney, to determine a global similarity or dissimilarity between messages that comment on the selected referent and messages that comment on other referents.

In a further embodiment, topic modeling, such as Latent Dirichlet Allocation ("LDA") can be used to determine a similarity of the messages, both locally and globally. LDA is a generative model that assumes latent topics are responsible for the generation of the words in each extended message. Each topic consists of a list of words where each word has a weight. Further, each message is a mixture of a given number of topics and each word in each message is attributable to one or more of the topics, with a given weight for each topic. Therefore, the similarity among the messages would be computed based on a similarity of the underlying topics to which the words are attributable.

Finally, leveraging the local and global similarity measures, the candidate labels in each message with the selected message component are ranked based on their contribution in increasing the local similarity measure and decreasing the global similarity measure. Thus, a weight or rank can be assigned (block 44) to each candidate label based on how discriminatory that word is of the referent associated with the selected message component. For example, a very discriminatory word would occur in most or all of the messages about the selected referent but rarely or never in the messages about the other referents. A determination as to the discriminatory value of a candidate label can be calculated, as mentioned above, by leveraging the local and global similarity measures. The labels with highest discriminatory value are the labels that (at the same time) contribute the most to the local similarity among the messages with the same message component, for example, all the messages that contain "Barack Obama" or a specific URL, and the least to the global similarity among the larger vectors, where each vector combines all the messages with the same message component such as a URL or a unique name. For instance, returning to the above example, the word "African-American" would appear often in the messages about Barack Obama, and thus contributes to the local similarity among these messages, but would appear very rarely in messages about "Mitt Romney" or other US presidential candidates, when this is the domain of interest.

Returning to the above discussion with reference to FIG. 3, the weights assigned to the candidate labels for the messages with the selected message component can be used to make a determination as to whether one or more of the candidate labels are discriminatory of the referent associated with that message component (block 36). If determined to be discriminatory, the candidate labels can be selected as distinguishing labels for the referent. In one embodiment, those candidate labels with the highest weights are identified as discriminatory of the referent. The candidate labels with the highest weights can be determined via a threshold, a rank value, or via an absolute value, such as a predetermined number of words. Alternatively, a combination of the threshold, rank value, or absolute value can be used to identify discriminatory labels. For example, the top five words with the highest weights and that are located in at least 70% of the messages can be selected.

In general, the discriminatory labels are those words that tend to only occur in connection with the particular referent. The labels provide information about the referent regardless of the content actually contained in the referent and can be used to characterize content of the message (block 37). The message characterization can include whether the content is descriptive of or includes an opinion of the referent, as well as whether the content provides positive or negative information related to the referent. Characterization of the message content is further described below with reference to FIGS. 5-8.

Figure 4:
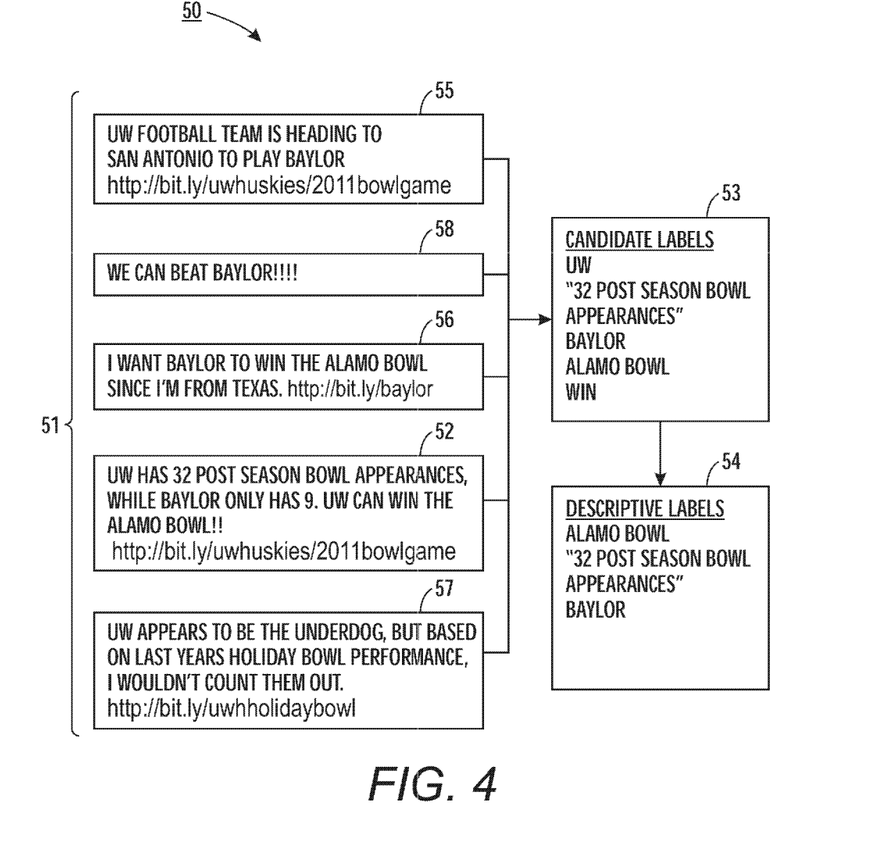
FIG. 4 is a block diagram showing, by way of example, a process for determining descriptive labels for tweet messages according to the method of FIG. 2.

In one example of determining discriminatory labels for characterizing message content, the messages can include tweet messages exchanged via Twitter. FIG. 4 is a block diagram showing, by way of example, a process 50 for determining discriminatory labels for tweet messages according to the method of FIG. 2. A corpus 51 of tweet messages is identified. The message corpus 51 can include one or more topics of information shared between users. At least one of the messages with a predetermined message component is identified. In this example, the message 52 with content that recites "UW has 32 post season bowl appearances, while Baylor only has 9. UW can win the Alamo Bowl! http://bit.ly/uwhuskies/2011bowlgame" is selected. The URL, http://bit.ly/uwhuskies/2011bowlgame, acts as a pointer to a remotely or locally stored referent, such as a Web document (not shown). The URL is extracted, along with the words surrounding the URL. The extracted words and word phrases 53 represent candidate labels that may potentially describe or distinguish the referent from other referents. The candidate labels include "UW," "32 post season bowl appearances," "Baylor," "win," and "Alamo Bowl."

Next, a vector of the candidate labels 53 is generated for the message 52 along with tf-idf values for each of the candidate labels. The vector is then compared with vectors for each of the messages in the corpus 51 that include the same message component, such as the URL, http://bit.ly/uwhuskies/

2011bowlgame. In this example, a vector is generated for the message 55 with content that recites "UW football team is heading to San Antonio to play Baylor http://bit.ly/uwhuskies/2011bowlgame" and the vector is compared to the vector of the selected message. The similarity of the two messages is computed using, for example, cosine similarity, by comparing the bag-of-words vectors for each of the two messages 52, 55. For example, the messages 52, 55 share the words "UW" and "Baylor," which contributes to an increase of the similarity measure for the two messages. In contrast, words with only a single occurrence in one of the messages do not contribute to increasing the similarity measure.

Next, a single bag-of-words referent vector is generated using the extracted words from all the messages that share the URL, http://bit.ly/uwhuskies/2011bowlgame. Other referent vectors are generated for each of the other message components identified in the corpus by that do not include the URL, http://bit.ly/uwhuskies/2011bowlgame, but include for example, another URL. The other referent vectors can be generated the same as or different than the original referent vector. In one embodiment, the other referent vectors are generated using the same method as the original referent vector, such as by extracting words from the messages that share a common referent, other than the referent from the selected message, and determining tf-idf scores for the words. For instance, referent vectors are generated from all the messages that include the URLs http://bit.ly/uwholidaybowl and http://bit.ly/baylor. The referent vector for the URL http://bit.ly/uwhuskies/2011bowlgame is then compared with each of the other referent vectors to determine similarity of the messages for the referents. Those words that are more frequent and discriminatory across URLs will receive a higher tf-idf value. If two bag-of-words vectors have high tf-idf values on different terms, these values contribute to decrease the similarity among the documents. Subsequently, a weight is assigned to the words based on how discriminatory the word is of that referent. The words with the highest weights are selected as discriminatory labels 54 based on a weight threshold or an absolute number of discriminatory labels.

Figure 5:
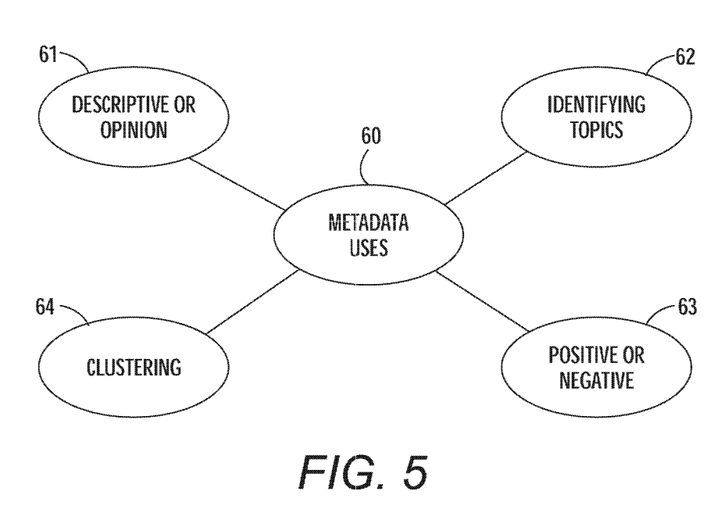
FIG. 5 is a block diagram showing, by way of example, uses of the discriminatory labels.

Once identified, the discriminatory labels can be used to provide information about the message. FIG. 5 is a block diagram showing, by way of example, uses 60 of the discriminatory labels. The discriminatory labels can be used 60 to determine whether a message provides content that is descriptive of or an opinion of the referent 61 associated with the message component in that message. Determining whether a message is descriptive or opinion related is discussed below in further detail with reference to FIG. 6. The labels can also be used to determine whether the message content reflects positive or negative information 63 regarding the referent. Determining whether a message includes positive or negative content is described below in further detail with reference to FIG. 7. Additionally, the discriminatory labels can be used to identify topics 62 of the message and cluster 64 the messages, such as based on similarity.

Figure 6:
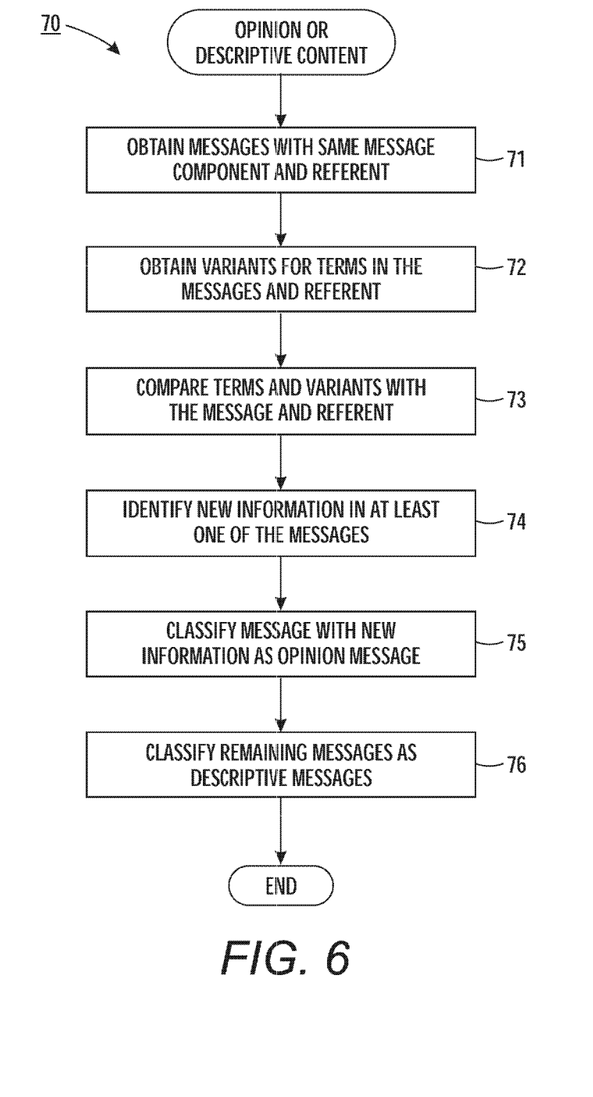
FIG. 6 is a flow diagram showing, by way of example, a process for characterizing message content as descriptive or opinion.

The discriminatory labels can assist in characterizing a message by determining whether the message content provides a description of the referent or includes opinions by the message author that are related to the referent. FIG. 6 is a flow diagram showing, by way of example, a process for characterizing message content as descriptive or opinion. All messages with the same message component are obtained, along with the referent to which the message component points (block 71). The terms in the messages are identified and variants are determined (block 72) for one or more of the terms. The variants can include words with a different level of abstraction, such as a higher level of generality. For example, if the term is a sparrow, the variants can include passeridae, bird, or animal. The variants can be determined using a lexical database of words, such as WordNet. However, other databases are possible. At a minimum, the lexical database should include groupings of synonyms, known as synsets. Each word in a particular synset can be considered an equivalent for comparison purposes.

The terms and variants in each message are compared (block 73) with the terms and variants identified in the referent to identify new information (block 74) in at least one of the messages. During the comparison, the new information is determined by identifying words, including nouns and noun phrases that are included in the message, but not in the referent. For example, if the word "bird" is included in the message, while the referent, includes the word "sparrow," the two words are considered to be the same, since "bird" is a variant of "sparrow." However, if the message includes the word "bird" and the referent includes the word "mammal," the two words would be considered to be different and the word "bird" in the message can be considered to be new information, not included in the referent. The new information in the message can represent content provided by the author of the message, such as an opinion regarding the referent. Therefore, a message with new information can be classified as an opinion message (block 75), while a message with no new information can be classified as a descriptive message (block 76).

Figure 7:
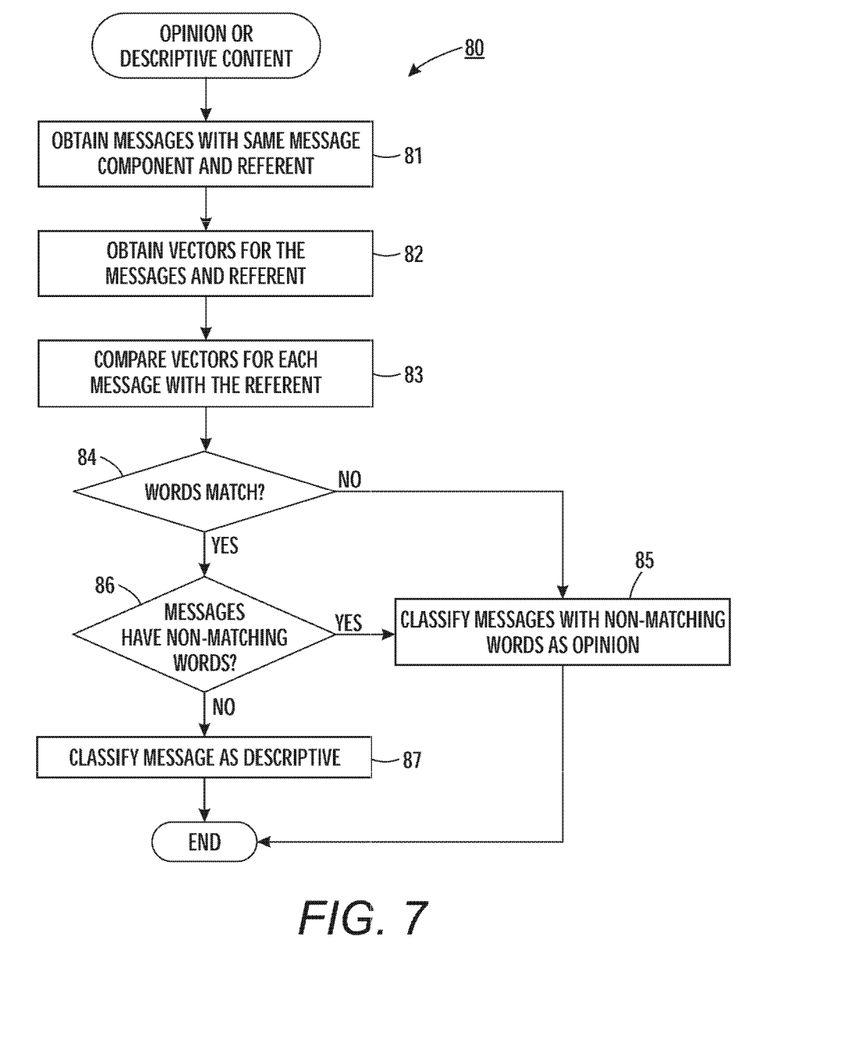
FIG. 7 is a flow diagram showing, by way of example, an alternative method for characterizing message content as descriptive or opinion.

In a further embodiment, the message content can be classified as a descriptive message, which is less, equally, or more specific than the referent or as an opinion message using word frequency. FIG. 7 is a flow diagram showing, by way of example, an alternative method for characterizing message content as descriptive or opinion. Messages with the same message component are obtained (block 81), as well as the referent to which the message component points. Vectors are generated (block 82) for each of the messages and the referent by extracting the words of each messages and referent, respectively, and determining tf-idf values for each of the words. In one embodiment, the stop words are removed prior to generating the vector. In a further embodiment, term expansion technique, which is described above with reference to FIG. 3, can be applied prior to determining the vector. Alternatively, the vectors are obtained if previously generated, such as described above with reference to FIG. 3. The words of the vector for the referent are compared (block 83) with the words of the vector for each message with the message component for the referent. A determination is made as to whether each message and the referent are similar by determining whether the words from the vector of that message match the words of the referent vector (block 84). For example, similarity between the referent and each associated message can be computed using cosine similarity based on the respective vectors. However, other similarity measures can be used. If the similarity between the referent and one of the messages is low, such that the vectors share only some words or do not share any words, then the message is classified as an opinion (block 85).

In one embodiment, a determination as to whether a message and referent are similar can be made based on a similarity threshold or a common word threshold. For instance, a threshold can be applied to the similarity measure and if the similarity measure satisfies the threshold, the message is determined to be similar to the referent. Alternatively, a number of shared words can be determined between the message and the referent and a word threshold can be applied to the total number of shared words. If the total number of shared words satisfies the threshold, the message is determined to be similar to the referent. Upon comparison, if the words of a message and the referent match, or the similarity measure is high, a determination is made as to whether the message includes non-matching words with the referent (block 86). Specifically, the message is analyzed for words that occur in the message, but not in the referent. If the message does not include any words that are not in the referent, the message is classified as descriptive (block 87). However, if the message includes non-matching words, or words that are not included in the referent, the message is classified as an opinion (block 85).

If a message is classified as descriptive, a super-subordinate semantic relation between the message and referent can be inferred to determine whether the descriptive message is more, less, or equally descriptive of the referent. A determination regarding the specificity of a descriptive message is made using public thesaurus-like resources or ontologies, such as WordNet. These resources tell us not only if two words are synonyms, but, if they are synonyms, also if one is superordinate to the other. For example, the term 'bird' has a relation of hypernym or superordinate to the term 'parrot' because every parrot is a bird, but not every bird is a parrot. In general, this type or public ontologies can be used to learn about either lexical relations among the words or semantic relations between the meanings of these words. These semantic relations include hypernymy/hyponymy (superordinate/subordinate) relationships, antonymy (or opposite meaning), entailment (for example, in relation of consequence or accompaniment), and meronymy/holonymy (or part of) relationships.

To determine the specificity of each message, the words remaining after removal of the stop words and prior to term expansion are compared with words obtained from the referent after removing the stop words. The comparison can be done applying computational linguistics methods that are based on public lexical databases, such as WordNet, to define the super-subordinate relation. Applying this type of embodiment, for example, we can automatically or semi-automatically, including the human input in the loop, isolate metadata that gives more general descriptions or help to categorize the message.

Determining the specificity of a message is also useful when categorizing the content of a set of messages. For example, the messages with labels that contain the most superordinate or general terms can be selected automatically or semi-automatically as candidates for the most general or highest order of content categories. Then, in turn, the labels that contain less superordinate or general terms can use selected automatically or semi-automatically, including the human input in the loop, as candidates for the subcategories of content. Overall this will define a hierarchy of categories.

Once a message is classified as descriptive of the referent or as providing an opinion regarding the referent, the opinion messages can be further characterized as having content, or commentary text, that is positive or negative. Characterization of the commentary text can be performed using sentiment analysis methods, such as in the analysis of online product reviews. For example there are public datasets with sentiment lexicons in terms of lists of positive and negative terms, such as freely distributed lists of strings, including Bing Liu's opinion lexicon and SentiWordNet, http://sentiment.christopherpotts.net/lexicons.html.

Figure 8:
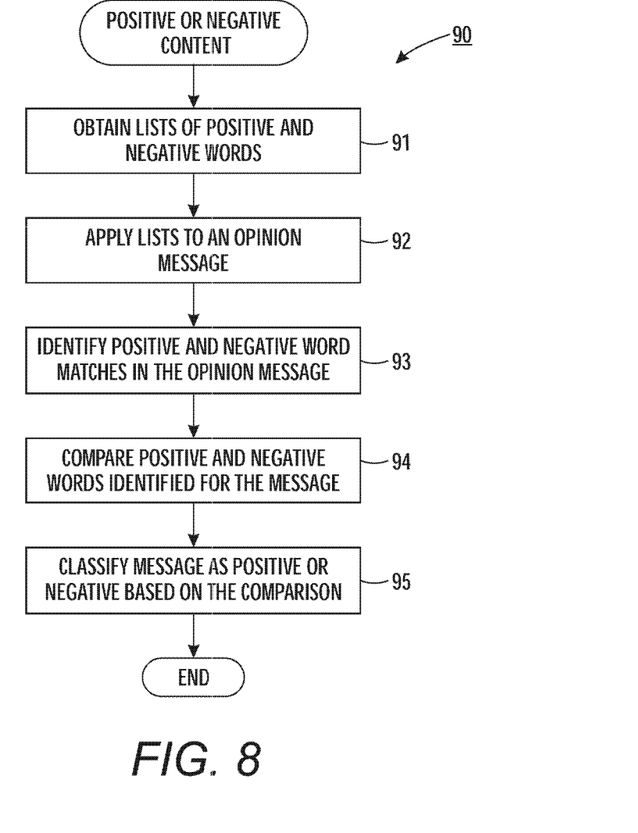
FIG. 8 is a flow diagram showing, by way of example, a process for characterizing message content as positive or negative.

FIG. 8 is a flow diagram showing, by way of example, a process for characterizing opinion message content as positive or negative. Lists of predetermined positive and negative words are obtained (block 91). Examples of positive and negative words, also called polar words, can include positive words, such as "beautiful, wonderful, good, or amazing" and negative words, such as "bad, poor, terrible, horrible, or cost an arm and a leg." The lists are applied (block 92) to at least one message that has been determined to provide an opinion regarding a particular referent. Words in the message are identified as positive or negative (block 93) based on a match with a word in the positive or negative lists. Once identified, the positive and negative words are compared (block 94) to classify the message as a positive or negative message based on the comparison (block 95).

The message can be classified based on a ratio of positive to negative words, a threshold of positive and negative words, or an absolute number of positive and negative words. For example, if the message includes a higher number of positive words than negative words, the message can be classified as positive. In a further example, a threshold can be set to 70% and any message that includes 70% or more positive words can be classified as positive. Finally, examples of an absolute number for classifying a message as positive include having one or more positive words and no negative words in a message, or having three positive words and one negative word. Other examples and values for the ratio, threshold, and absolute number of positive and negative words are positive.

Determining whether a message provides fact, positive opinion, or negative opinion can assist in the design of articles based on the expected reactions and responses from an audience. Specifically, authors can utilize the information to determine what type of documents or subjects will generate a particular outcome.

Additionally, the discriminatory labels can used to aggregate message content based on topics that are determined according to prior knowledge, such as provided in Wikipedia. Also, the labels can be used to cluster the message content. The labels can also be used as tags through which the users can browse the content of the collection of referents.

In a further embodiment, the above described method for extracting and reusing metadata for analyzing message content can also be applied to email messages. In the case of email message there may be less need for term expansion and the semi-structured nature of the email message can also be exploited by giving different weight to text in different fields: the text in the subject would be weighted as more relevant than the text in the body.

While the invention has been particularly shown and described as referenced to the embodiments thereof, those skilled in the art will understand that the foregoing and other changes in form and detail may be made therein without departing from the spirit and scope of the invention.

What is claimed is:

1. A system for extracting and reusing metadata to analyze message content, comprising:
   a stream of messages; and
   a central processing unit of a computer to execute modules, comprising:
      an identification module to identify those messages with a predetermined message component pointing to a referent;
      an extractor to extract words that comprise metadata and that are related to the referent from each of the messages;
      a comparer to determine a local similarity of the identified messages by comparing the extracted words of each message and to further determine a global similarity of the identified messages by combining the extracted words from all the identified messages and by comparing the combined extracted words with extracted words from all messages that include a different referent; and a determination module to determine whether one or more of the extracted words from the identified messages are descriptive of the referent based on the local and global comparisons.

2. A system according to claim 1, further comprising:
a label module to identify the descriptive words for the referent by determining those words that contribute to the local similarity and not to the global similarity.

3. A system according to claim 1, further comprising:
an assignment module to assign a weight to each candidate word based on a level of descriptiveness of the referent, to apply a threshold to the weights, and to select those words with weights that satisfy the threshold as the descriptive words for the referent.

4. A system according to claim 1, further comprising:
a content module to determine whether content of one or more of the messages comprises one of descriptive or opinion content by extracting words from the referent, semantically comparing the extracted words for the referents with the extracted words for the message, and assigning one of a descriptive content label or opinion content label to the at least one message based on the semantic comparison.

5. A system according to claim 4, further comprising:
a classification module to determine whether the message includes new words that are not included in the referent using the semantic comparison, to classify the message as an opinion message when the message includes the new words by assigning the opinion content label, and to classify the message as a descriptive message when the message does not include the new words by assigning the descriptive content label.

6. A system according to claim 1, further comprising:
a tagging module to utilize at least one of the extracted words as a tag for the message.

7. A system according to claim 1, further comprising:
a list of positive words and a list of negative words to content of at least one of the messages;
a classifier to identify words in the message as positive or negative and to classify the message as positive or negative based on a number of identified positive words and a number of identified negative words.

8. A system according to claim 1, further comprising:
a frequency module to calculate a frequency of each of the extracted words with respect to the referent across the identified messages and to identify the words that are used multiple times with the referent as labels for the referent.

9. A system according to claim 1, further comprising at least one of:
a message component identification module to identify the predetermined message component as a Uniform Resource Locator via natural language processing techniques and to identify the predetermining message component as a unique name via entity extraction.

10. A system according to claim 1, wherein the words are extracted from the at least one message using natural language processing techniques.

11. A method for extracting and reusing metadata to analyze message content, comprising:
monitoring a stream of messages;
identifying those messages with a predetermined message component pointing to a referent;
extracting words that comprise metadata and that are related to the referent from each of the messages;
determining a local similarity of the identified messages by comparing the extracted words of each message;
determining a global similarity of the identified messages by combining the extracted words from all the identified messages and comparing the combined extracted words with extracted words from all messages that include a different referent; and
determining whether one or more of the extracted words from the identified messages are descriptive of the referent based on the local and global comparisons.

12. A method according to claim 11, further comprising:
identifying the descriptive words for the referent by determining those words that contribute to the local similarity and not to the global similarity.

13. A method according to claim 11, further comprising:
assigning a weight to each candidate word based on a level of descriptiveness of the referent;
applying a threshold to the weights; and
selecting those words with weights that satisfy the threshold as the descriptive words for the referent.

14. A method according to claim 11, further comprising:
determining whether content of one or more of the messages comprises one of descriptive or opinion content, comprising:
extracting words from the referent;
semantically comparing the extracted words for the referents with the extracted words for the message; and
assigning one of a descriptive content label or opinion content label to the at least one message based on the semantic comparison.

15. A method according to claim 14, further comprising:
using the semantic comparison, determining whether the message includes new words that are not included in the referent;
classifying the message as an opinion message when the message includes the new words by assigning the opinion content label; and
classifying the message as a descriptive message when the message does not include the new words by assigning the descriptive content label.

16. A method according to claim 11, further comprising:
utilizing at least one of the extracted words as a tag for the message.

17. A method according to claim 11, further comprising:
applying a list of positive words and a list of negative words to content of at least one of the messages;
identifying words in the message as positive or negative; and
classifying the message as positive or negative based on a number of identified positive words and a number of identified negative words.

18. A method according to claim 11, further comprising:
calculating a frequency of each of the extracted words with respect to the referent across the identified messages; and
identifying the words that are used multiple times with a referent.

19. A method according to claim 11, further comprising at least one of:
identifying the predetermined message component as a Uniform Resource Locator via natural language processing techniques; and
identifying the predetermining message component as a unique name via entity extraction.

20. A method according to claim 11, further comprising:
extracting the words from the at least one message using natural language processing techniques.

\* \* \* \* \*